US008648780B2

(12) United States Patent
Feng

(10) Patent No.: US 8,648,780 B2
(45) Date of Patent: Feb. 11, 2014

(54) MOTION ADAPTIVE BLACK DATA INSERTION

(75) Inventor: Xiao-Fan Feng, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1433 days.

(21) Appl. No.: 11/489,377

(22) Filed: Jul. 18, 2006

(65) Prior Publication Data

US 2008/0018571 A1 Jan. 24, 2008

(51) Int. Cl.
*G09G 3/36* (2006.01)
*G06F 3/038* (2013.01)
*G09G 5/00* (2006.01)

(52) U.S. Cl.
USPC ................ 345/89; 345/102; 345/204; 345/87

(58) Field of Classification Search
USPC ...................................... 345/102, 89, 204, 87
See application file for complete search history.

(56) References Cited

U.S. PATENT DOCUMENTS

| | | | | |
|---|---|---|---|---|
| 5,337,068 | A * | 8/1994 | Stewart et al. | 345/88 |
| 6,414,664 | B1 * | 7/2002 | Conover et al. | 345/89 |
| 6,894,669 | B2 * | 5/2005 | Suzuki et al. | 345/87 |
| 7,161,576 | B2 | 1/2007 | Kawabe | |
| 2002/0003522 | A1 * | 1/2002 | Baba et al. | 345/89 |
| 2003/0169247 | A1 * | 9/2003 | Kawabe et al. | 345/204 |
| 2005/0062681 | A1 | 3/2005 | Honbo | |
| 2005/0068343 | A1 * | 3/2005 | Pan et al. | 345/690 |
| 2005/0275646 | A1 * | 12/2005 | Pai et al. | 345/204 |
| 2006/0139285 | A1 * | 6/2006 | Tsai | 345/98 |
| 2006/0146005 | A1 * | 7/2006 | Baba et al. | 345/102 |
| 2006/0227249 | A1 * | 10/2006 | Chen et al. | 348/631 |
| 2006/0284897 | A1 * | 12/2006 | Shen et al. | 345/690 |
| 2010/0020002 | A1 | 1/2010 | Van Woudenberg et al. | |

FOREIGN PATENT DOCUMENTS

| | | | |
|---|---|---|---|
| EP | 1521237 | A2 | 4/2005 |
| JP | 2001-108962 | A | 4/2001 |
| JP | 2001-125067 | | 5/2001 |
| JP | 2002-287700 | A | 4/2002 |
| JP | 2003-241721 | | 8/2003 |
| JP | 2003-241721 | A | 8/2003 |
| JP | 2004-020738 | | 1/2004 |
| JP | 2004-309592 | A | 4/2004 |
| JP | 2005-037899 | A | 2/2005 |
| JP | 2005-107531 | | 4/2005 |
| JP | 2005-326614 | | 11/2005 |
| JP | 2005-326614 | A | 11/2005 |
| JP | 2006-162909 | A | 6/2006 |
| JP | 2008-525839 | A | 7/2007 |

OTHER PUBLICATIONS

International Search Report and Written Opinion of the International Searching Authority for PCT/JP2007/064297 filed Jul. 12, 2007, 7 pages.

(Continued)

*Primary Examiner* — Jonathan Horner
(74) *Attorney, Agent, or Firm* — Chernoff Vilhauer McClung & Stenzel, LLP

(57) ABSTRACT

A backlight display has improved display characteristics. An image is displayed on the display which includes a liquid crystal material with a light valve. The display receives an image signal and modifies the light based upon motion.

9 Claims, 17 Drawing Sheets

Motion adaptive black data insertion

(56) References Cited

OTHER PUBLICATIONS

Supplementary European Search Report, dated Aug. 24, 2010 in co-pending European Patent Application No. 07768448.8, published Apr. 22, 2009; 3 pgs.
European Office Action, dated Apr. 13, 2011, Sharp Kabushiki Kaisha, Application. No. 07 768 448.8-2205, 8 pgs.
Japanese Office Action, dated Mar. 1, 2011, Japanese Patent App. No. 2006-056636, based on U.S. Appl. No. 11/157,231 of Sharp Kabushiki Kaisha, 2 pgs.
Official Communication, dated Nov. 1, 2011, for Japanese Patent App. No. 2009-517688, Sharp Kabushiki Kaisha, 4 pgs.
Translation of Japanese Office Action dated Nov. 1, 2011, for Japanese Patent App. No. 2009-517688, Sharp Kabushiki Kaisha, 6 pgs.
European Patent Office Action, dated Aug. 12, 2011, for European App. No. 07 768 448.86 in the name of Sharp Kabushiki Kaisha, 9 pgs.

* cited by examiner

LCD system configuration

Flashing backlight scheme to reduce the motion blur

The one-frame buffer non-recursive overdrive model

The one-frame buffer recursive overdrive model

Adaptive recursive overdrive algorithm optimized for backlight flashing

Overdrive value lookup

Driving waveform for measuring first order dynamic gamma

Measured first order dynamic gamma

Measured LCD display value as a function of previous display value and driving value Motion adaptive black data insertion Exemplary LUT for field driving value based on motion map values Lookup overdrive value from target value and previous display value LCD display output as a function of previous frame display luminance Alternative embodiment for motion adaptive BDI

MOTION ADAPTIVE BLACK DATA INSERTION

CROSS-REFERENCE TO RELATED APPLICATIONS

None

BACKGROUND OF THE INVENTION

The present invention relates to backlit displays and, more particularly, to a backlit display with improved performance characteristics.

The local transmittance of a liquid crystal display (LCD) panel or a liquid crystal on silicon (LCOS) display can be varied to modulate the intensity of light passing from a backlit source through an area of the panel to produce a pixel that can be displayed at a variable intensity. Whether light from the source passes through the panel to a viewer or is blocked is determined by the orientations of molecules of liquid crystals in a light valve.

Since liquid crystals do not emit light, a visible display requires an external light source. Small and inexpensive LCD panels often rely on light that is reflected back toward the viewer after passing through the panel. Since the panel is not completely transparent, a substantial part of the light is absorbed during its transit of the panel and images displayed on this type of panel may be difficult to see except under the best lighting conditions. On the other hand, LCD panels used for computer displays and video screens are typically backlit with fluorescent tubes or arrays of light-emitting diodes (LEDs) that are built into the sides or back of the panel. To provide a display with a more uniform light level, light from these points or line sources is typically dispersed in a diffuser panel before impinging on the light valve that controls transmission to a viewer.

The transmittance of the light valve is controlled by a layer of liquid crystals interposed between a pair of polarizers. Light from the source impinging on the first polarizer comprises electromagnetic waves vibrating in a plurality of planes. Only that portion of the light vibrating in the plane of the optical axis of a polarizer can pass through the polarizer. In an LCD, the optical axes of the first and second polarizers are arranged at an angle so that light passing through the first polarizer would normally be blocked from passing through the second polarizer in the series. However, a layer of the physical orientation of the molecules of liquid crystal can be controlled and the plane of vibration of light transiting the columns of molecules spanning the layer can be rotated to either align or not align with the optical axes of the polarizers. It is to be understood that normally white may likewise be used.

The surfaces of the first and second polarizers forming the walls of the cell gap are grooved so that the molecules of liquid crystal immediately adjacent to the cell gap walls will align with the grooves and, thereby, be aligned with the optical axis of the respective polarizer. Molecular forces cause adjacent liquid crystal molecules to attempt to align with their neighbors with the result that the orientation of the molecules in the column spanning the cell gap twist over the length of the column. Likewise, the plane of vibration of light transiting the column of molecules will be "twisted" from the optical axis of the first polarizer to that of the second polarizer. With the liquid crystals in this orientation, light from the source can pass through the series polarizers of the translucent panel assembly to produce a lighted area of the display surface when viewed from the front of the panel. It is to be understood that the grooves may be omitted in some configurations.

To darken a pixel and create an image, a voltage, typically controlled by a thin-film transistor, is applied to an electrode in an array of electrodes deposited on one wall of the cell gap. The liquid crystal molecules adjacent to the electrode are attracted by the field created by the voltage and rotate to align with the field. As the molecules of liquid crystal are rotated by the electric field, the column of crystals is "untwisted," and the optical axes of the crystals adjacent the cell wall are rotated out of alignment with the optical axis of the corresponding polarizer progressively reducing the local transmittance of the light valve and the intensity of the corresponding display pixel. Color LCD displays are created by varying the intensity of transmitted light for each of a plurality of primary color elements (typically, red, green, and blue) that make up a display pixel.

LCDs can produce bright, high resolution, color images and are thinner, lighter, and draw less power than cathode ray tubes (CRTs). As a result, LCD usage is pervasive for the displays of portable computers, digital clocks and watches, appliances, audio and video equipment, and other electronic devices. On the other hand, the use of LCDs in certain "high end markets," such as video and graphic arts, is frustrated, in part, by the limited performance of the display.

What is desired, therefore, is a liquid crystal display having reduced blur.

DETAILED DESCRIPTION OF PREFERRED EMBODIMENT

Figure 1A:
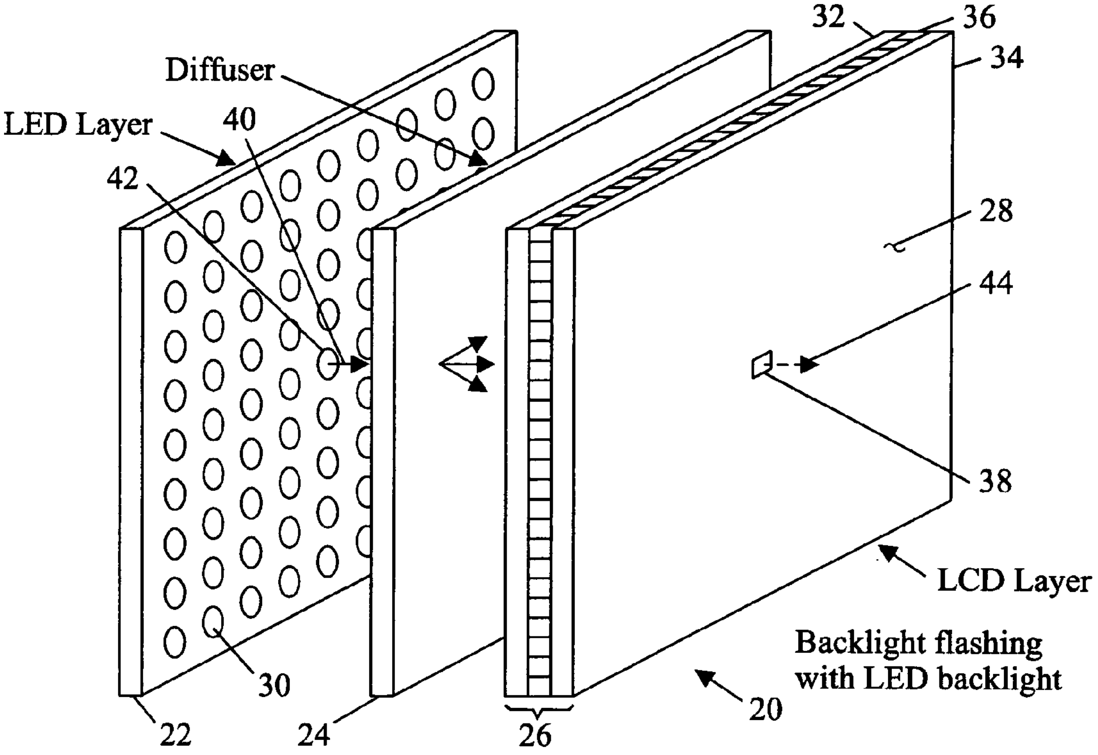
FIGS. 1A and 1B are schematic diagrams of liquid crystal displays (LCDs).
Figure 1B:
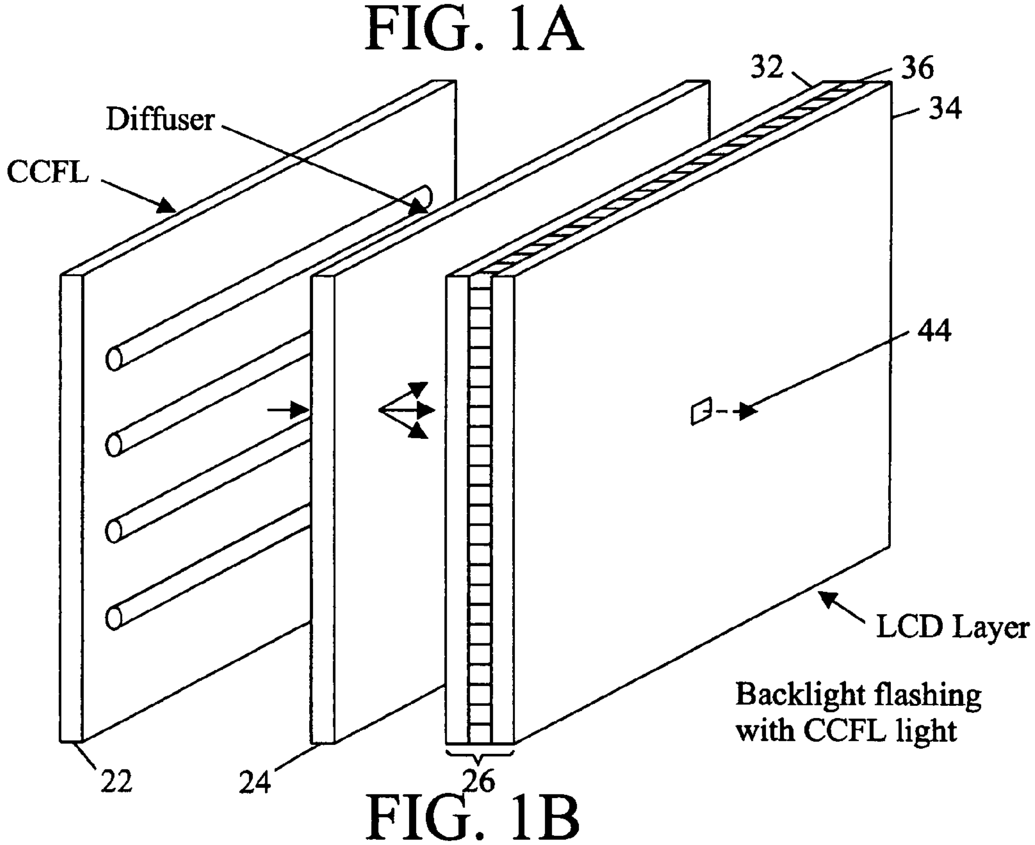

Referring to FIG. 1A, a backlit display 20 comprises, generally, a backlight 22, a diffuser 24, and a light valve 26 (indicated by a bracket) that controls the transmittance of light from the backlight 22 to a user viewing an image displayed at the front of the panel 28. The light valve, typically comprising a liquid crystal apparatus, is arranged to electronically control the transmittance of light for a picture element or pixel. Since liquid crystals do not emit light, an external source of light is necessary to create a visible image. The source of light for small and inexpensive LCDs, such as those used in digital clocks or calculators, may be light that is reflected from the back surface of the panel after passing through the panel. Likewise, liquid crystal on silicon (LCOS) devices rely on light reflected from a backplane of the light valve to illuminate a display pixel. However, LCDs absorb a significant portion of the light passing through the assembly and an artificial source of light such as the backlight 22 comprising fluorescent light tubes or an array of light sources 30 (e.g., light-emitting diodes (LEDs), as illustrated in FIG. 1A and fluorescent tubes as illustrated in FIG. 1B), are useful to produce pixels of sufficient intensity for highly visible images or to illuminate the display in poor lighting conditions. There may not be a light source 30 for each pixel of the display and, therefore, the light from the general point sources (e.g., LEDs) or general line sources (e.g., fluorescent tubes) is typically dispersed by a diffuser panel 24 so that the lighting of the front surface of the panel 28 is more uniform.

Light radiating from the light sources 30 of the backlight 22 comprises electromagnetic waves vibrating in random planes. Only those light waves vibrating in the plane of a polarizer's optical axis can pass through the polarizer. The light valve 26 includes a first polarizer 32 and a second polarizer 34 having optical axes arrayed at an angle so that normally light cannot pass through the series of polarizers. Images are displayable with an LCD because local regions of a liquid crystal layer 36 interposed between the first 32 and second 34 polarizer can be electrically controlled to alter the alignment of the plane of vibration of light relative of the optical axis of a polarizer and, thereby, modulate the transmittance of local regions of the panel corresponding to individual pixels 36 in an array of display pixels.

The layer of liquid crystal molecules 36 occupies a cell gap having walls formed by surfaces of the first 32 and second 34 polarizers. The walls of the cell gap are rubbed to create microscopic grooves aligned with the optical axis of the corresponding polarizer. The grooves cause the layer of liquid crystal molecules adjacent to the walls of the cell gap to align with the optical axis of the associated polarizer. As a result of molecular forces, each successive molecule in the column of molecules spanning the cell gap will attempt to align with its neighbors. The result is a layer of liquid crystals comprising innumerable twisted columns of liquid crystal molecules that bridge the cell gap. As light 40 originating at a light source element 42 and passing through the first polarizer 32 passes through each translucent molecule of a column of liquid crystals, its plane of vibration is "twisted" so that when the light reaches the far side of the cell gap its plane of vibration will be aligned with the optical axis of the second polarizer 34. The light 44 vibrating in the plane of the optical axis of the second polarizer 34 can pass through the second polarizer to produce a lighted pixel 28 at the front surface of the display 28.

To darken the pixel 28, a voltage is applied to a spatially corresponding electrode of a rectangular array of transparent electrodes deposited on a wall of the cell gap. The resulting electric field causes molecules of the liquid crystal adjacent to the electrode to rotate toward alignment with the field. The effect is to "untwist" the column of molecules so that the plane of vibration of the light is progressively rotated away from the optical axis of the polarizer as the field strength increases and the local transmittance of the light valve 26 is reduced. As the transmittance of the light valve 26 is reduced, the pixel 28 progressively darkens until the maximum extinction of light 40 from the light source 42 is obtained. Color LCD displays are created by varying the intensity of transmitted light for each of a plurality of primary color elements (typically, red, green, and blue) elements making up a display pixel. Other arrangements of structures may likewise be used.

The LCD uses transistors as a select switch for each pixel, and adopts a display method (hereinafter, called as a "hold-type display"), in which a displayed image is held for a frame period. In contrast, a CRT (hereinafter, called as an "impulse-type display") includes selected pixel that is darkened immediately after the selection of the pixel. The darkened pixel is displayed between each frame of a motion image that is rewritten in 60 Hz in case of the impulse-type display like the CRT. That is, the black of the darkened pixel is displayed excluding a period when the image is displayed, and one frame of the motion image is presented respectively to the viewer as an independent image. Therefore, the image is observed as a clear motion image in the impulse-type display. Thus, the LCD is fundamentally different from CRT in time axis hold characteristic in an image display. Therefore, when the motion image is displayed on a LCD, image deterioration such as blurring the image is caused. The principal cause of this blurring effect arises from a viewer that follows the moving object of the motion image (when the eyeball movement of the viewer is a following motion), even if the image is rewritten, for example, at 60 Hz discrete steps. The eyeball has a characteristic to attempt to smoothly follow the moving object even though it is discretely presented in a "hold type" manner.

However, in the hold-type display, the displayed image of one frame of the motion image is held for one frame period, and is presented to the viewer during the corresponding period as a still image. Therefore, even though the eyeball of the viewer smoothly follows the moving object, the displayed image stands still for one frame period. Therefore, the shifted image is presented according to the speed of the moving object on the retina of the viewer. Accordingly, the image will appear blurred to the viewer due to integration by the eye. In addition, since the change between the images presented on the retina of the viewer increases with greater speed, such images become even more blurred.

Figure 2:
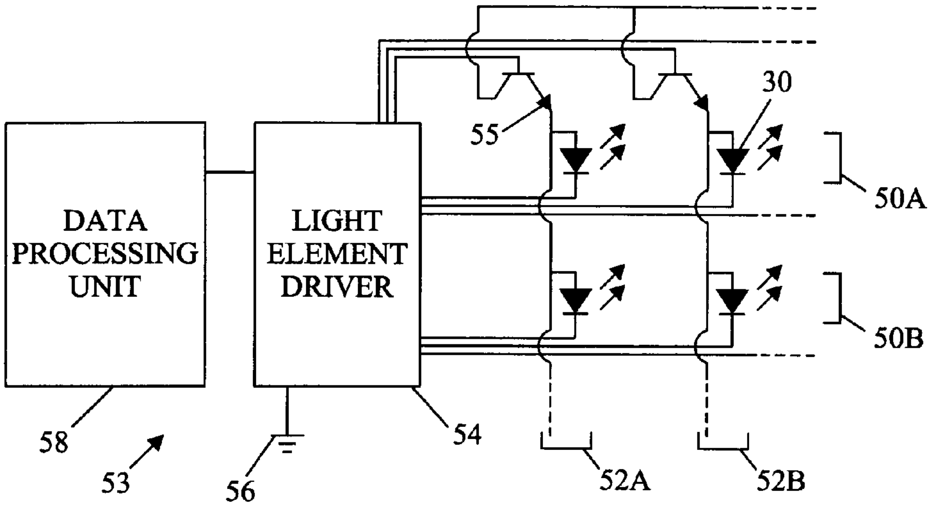
FIG. 2 is a schematic diagram of an exemplary driver for modulating the illumination of a plurality of light source elements of a backlight.

In the backlit display 20, the backlight 22 comprises an array of locally controllable light sources 30. The individual light sources 30 of the backlight may be light-emitting diodes (LEDs), an arrangement of phosphors and lensets, or other suitable light-emitting devices. In addition, the backlight may include a set of independently controllable light sources, such as one or more cold cathode ray tubes. The light-emitting diodes may be 'white' and/or separate colored light emitting diodes. The individual light sources 30 of the backlight array 22 are independently controllable to output light at a luminance level independent of the luminance level of light output by the other light sources so that a light source can be modulated in response to any suitable signal. Similarly, a film or material may be overlaid on the backlight to achieve the spatial and/or temporal light modulation. Referring to FIG. 2, the light sources 30 (LEDs illustrated) of the array 22 are typically arranged in the rows, for examples, rows 50*a* and 50*b*, (indicated by brackets) and columns, for examples, columns 52*a* and 52*b* (indicated by brackets) of a rectangular array. The output of the light sources 30 of the backlight are controlled by a backlight driver 53. The light sources 30 are driven by a light source driver 54 that powers the elements by selecting a column of elements 52*a* or 52*b* by actuating a column selection transistor 55 and connecting a selected light source 30 of the selected column to ground 56. A data processing unit 58, processing the digital values for pixels of an image to be displayed, provides a signal to the light driver 54 to select the appropriate light source 30 corresponding to the displayed pixel and to drive the light source with a power level to produce an appropriate level of illumination of the light source.

Figure 3:
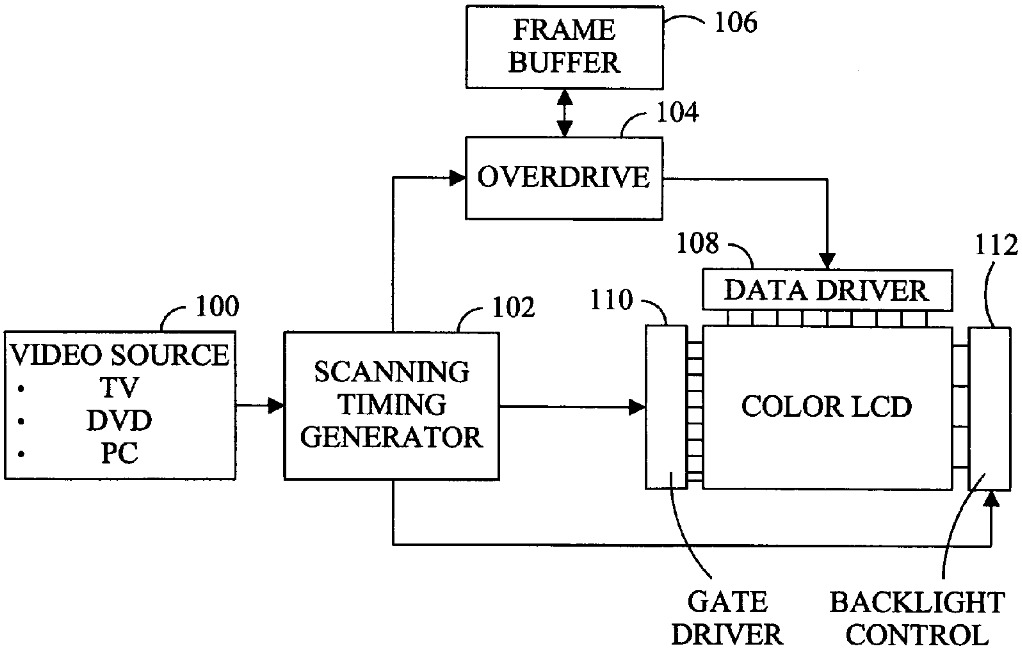
FIG. 3 illustrates an exemplary LCD system configuration.

FIG. 3 illustrates a block diagram of a typical data path within a liquid crystal panel. The video data 100 may be provided from any suitable source, such as for example, television broadcast, Internet connection, file server, digital video disc, computer, video on demand, or broadcast. The video data 100 is provided to a scanning and timing generator 102 where the video data is converted to a suitable format for presentation on the display. In many cases, each line of data is provided to an overdrive circuit 104, in combination with a frame buffer 106, to compensate for the slow temporal response of the display. The overdrive may be analog in nature, if desired. The signal from the overdrive 104 is preferably converted to a voltage value in the data driver 108 which is output to individual data electrodes of the display. The generator 102 also provides a clock signal to the gate driver 110, thereby selecting one row at a time, which stores the voltage data on the data electrode on the storage capacitor of each pixel of the display. The generator 102 also provides backlight control signals 112 to control the level of luminance from the backlight, and/or the color or color balance of the light provided in the case of spatially non-uniform backlight (e.g., based upon image content and/or spatially different in different regions of the display).

Figure 4A:
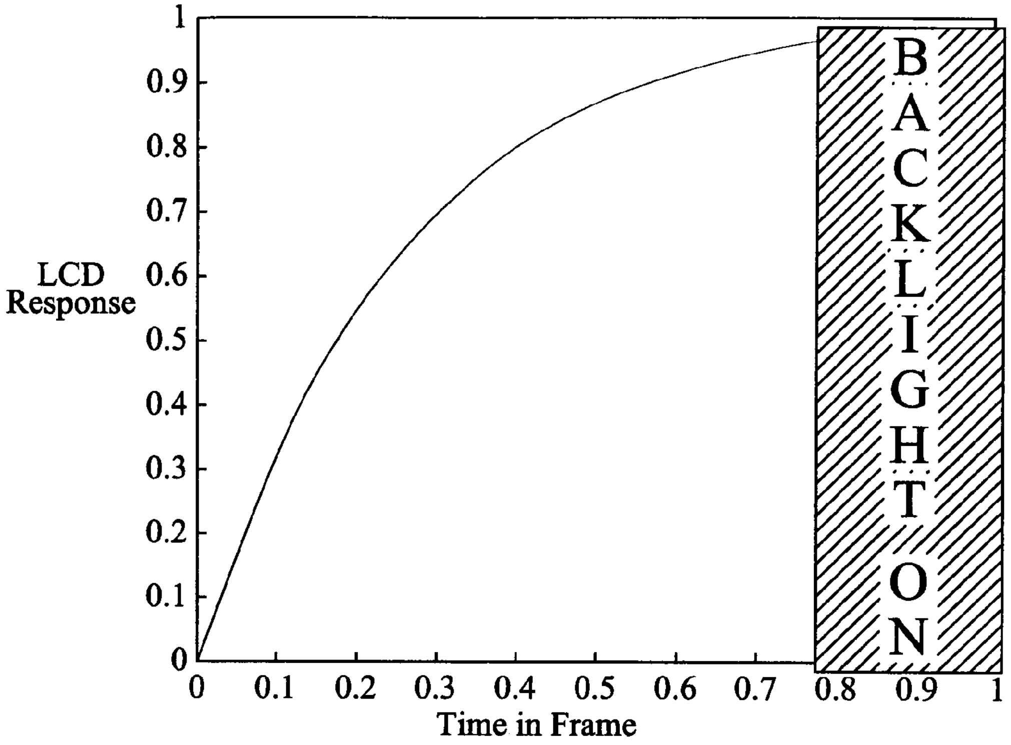
FIG. 4A illustrates an exemplary flashing backlight scheme.

The use of the overdrive circuit 104 tends to reduce the motion blur, but the image blur effects of eye tracking the motion while the image is held stationary during the frame time still causes a relative motion on the retina which is perceived as motion blur. One technique to reduce the perceived motion blur is to reduce the time that an image frame is displayed. FIG. 4A illustrates the effect of flashing the backlight during only a portion of the frame. The horizontal axis represents the elapsed time during a frame and the vertical axis represents a normalized response of the LCD during the frame. The backlight level is preferably set to zero during a portion of the frame or otherwise a significantly reduced level. It is preferable that the flashing of the backlight is toward the end of the frame where the transmission of the liquid crystal material has reached or otherwise is approaching the target level. For example, the majority of the duration of the flashing backlight is preferably during the last third of the frame period. While modulating the backlight in some manner reduces the perceived motion blur, it unfortunately tends to result in a flickering artifact, due to the general 'impulse' nature of the resulting display technique. In order to reduce the flickering, the backlight may be flashed at a higher rate.

Figure 4B:
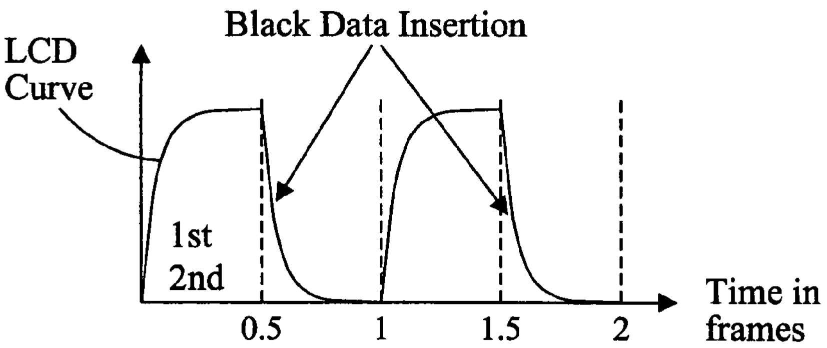
FIG. 4B illustrates an exemplary

FIG. 4B illustrates a black data insertion technique that reduces the display temporal aperture thus reducing motion blur. Each frame is divided into two fields where the first field contains the display data and the second field is driven to black. Accordingly, the display is "on" for only about half of the frame.

Figure 5:
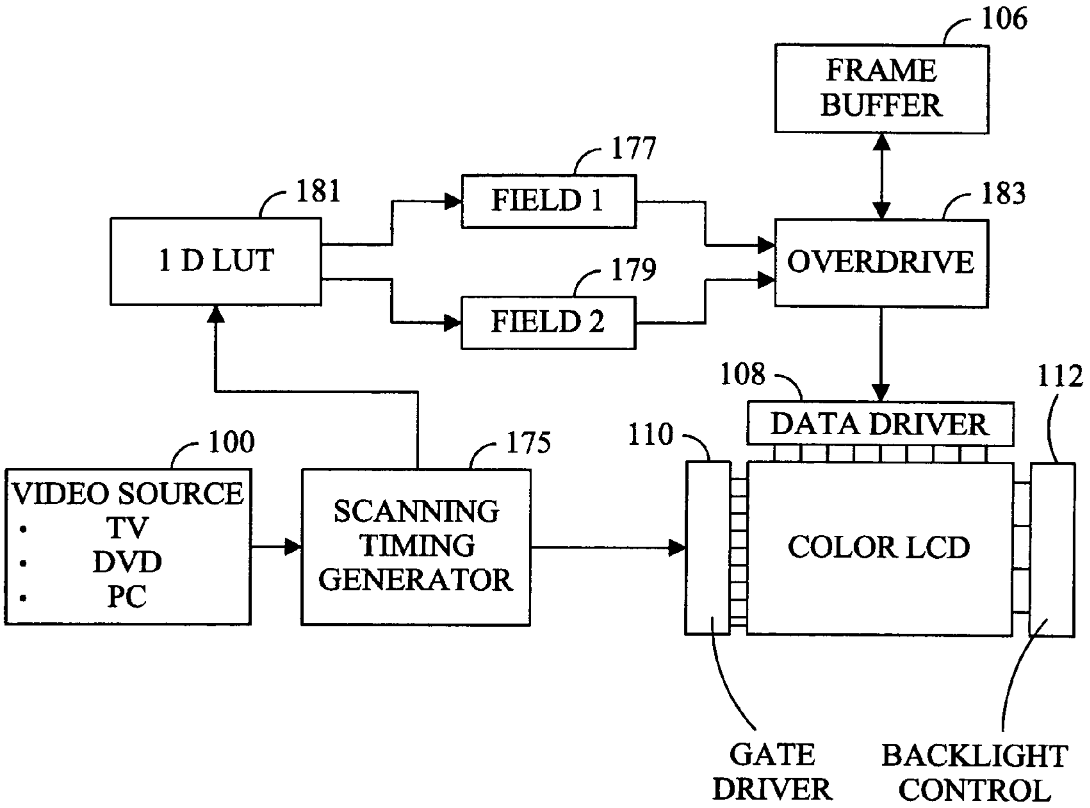
FIG. 5 illustrates an adaptive black data insertion technique.
Figure 6A:
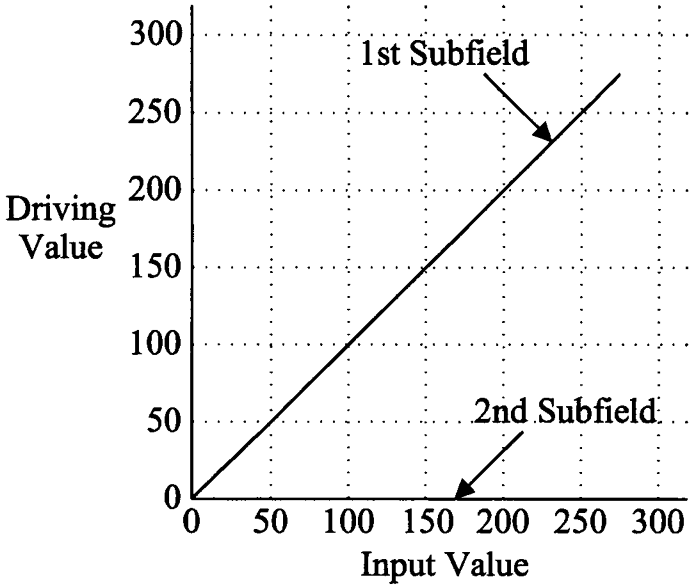
FIGS. 6A and 6B illustrate transfer field functions.
Figure 6B:
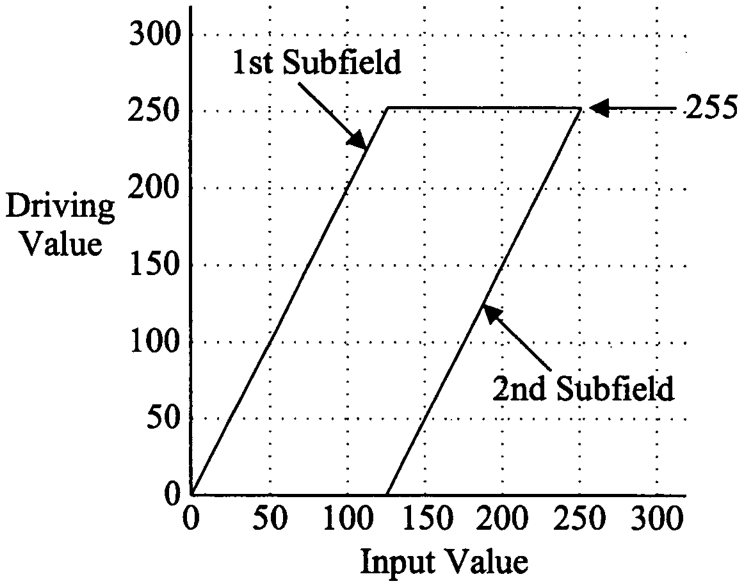

Referring to FIG. 5, the input frame 100 is provided to a scanning timing generator 175. The scanning timing generator 175 converts the input frame into two fields 177 and 179 using a look up table 181, such as a one dimensional look up table. The two fields 177 and 179 are then provided to an overdrive 183. Referring to FIG. 6, the look up table 181 may take the form of a pair of functions. As shown in FIG. 6A, the first field 177 is set to the same as the input, while the second field 179 is set to zero (e.g., black). The embodiment shown in FIG. 6A achieves a significant black point insertion into the image. Unfortunately, this technique results in significant brightness reduction and has blurring at high luminance. As shown in FIG. 6B, the first field 177 may be set to twice of the input data until it reaches a desired level, such as the maximum (e.g., 255), and then the second subfield starts to increase from a low value, such as zero, to a desired level, such as the maximum (e.g., 255). The technique shown in FIG. 6B increases the brightness over that shown in FIG. 6A, while moderating the motion blur that may occur at a high luminance.

Figure 7:
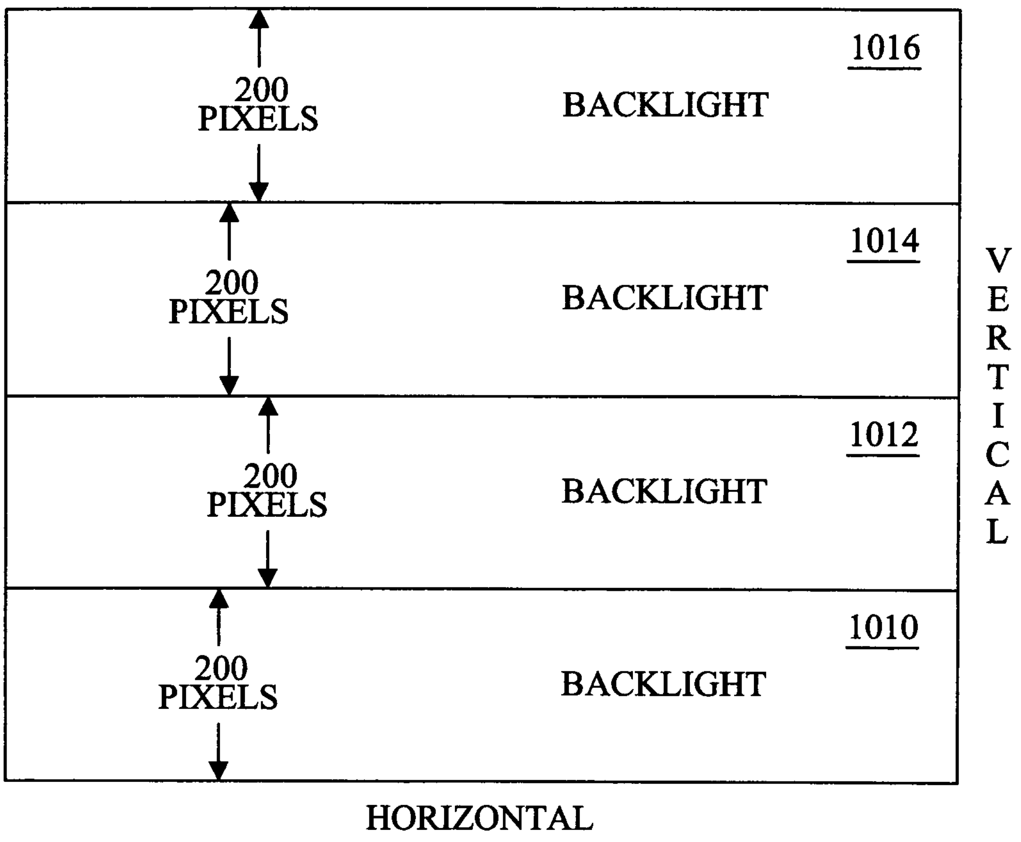
FIG. 7 illustrates an exemplary segmented backlight.

Referring to FIG. 7, illustrating a rectangular backlight structure of the display, the backlight may be structured with a plurality of different regions. For example, the backlight may be approximately 200 pixels (e.g., 50-400 pixel regions) wide and extend the width of the display. For a display with approximately 800 pixels, the backlight may be composed of, for example, 4 different backlight regions. In other embodiments, such as an array of light emitting diodes, the backlight may be composed of one or more rows of diodes, and/or one or more columns of diodes, and/or different areas in general.

Figure 8:
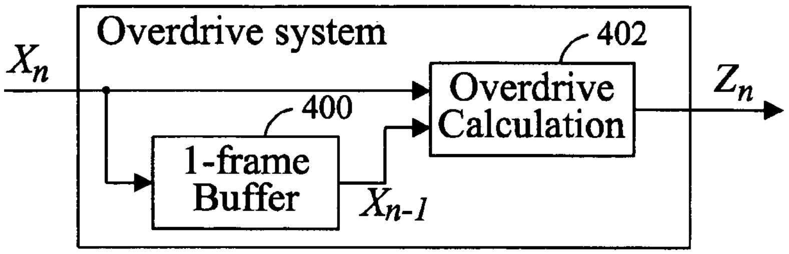
FIG. 8 (PRIOR ART)
FIG. 8 illustrates an exemplary prior-art one-frame buffer overdrive.

A typical implementation structure of the conventional overdrive (OD) technology is shown in FIG. 8. The implementation includes one frame buffer 400 and an overdrive module 402. The frame buffer stores previous target display value $x_{n-1}$ of driving cycle n-1. The overdrive module, taking current target display value $x_n$ and previous display value $x_{n-1}$ as input, derives the current driving value $z_n$ to make the actual display value $d_n$ the same as the target display value $x_n$.

In a LCD panel, the current display value $d_n$ is preferably not only determined by the current driving value $z_n$, but also by the previous display value $d_{n-1}$. Mathematically, $$d_n=f_d(z_n,d_{n-1}) \quad (1)$$

To make the display value $d_n$ reach the target value $x_n$, overdriving value $z_n$ should be derived from Equation (1) by making $d_n$ to be target value $x_n$. The overdriving value $z_n$ is determined in this example by two variables: the previous display value $d_{n-1}$ and the current driving values $x_n$, which can be expressed by the following function mathematically:

$$z_n=f_z(x_n,d_{n-1}) \quad (2)$$

Equation (2) shows that two types of variables: target values and display values, are used to derive current driving values. In many implementations, however, display values are not directly available. Instead, the described one-frame-buffer non-recursive overdrive structure assumes that every time the overdrive can drive the display value $d_n$ to the target value $x_n$. Therefore, Equation (2) can readily be simplified as $$z_n=f_z(x_n,x_{n-1}) \quad (3)$$

In Equation (3), only one type of variable: target values, is needed to derive current driving values, and this valuable is directly available without any calculation. As a result, Equation (3) is easier than Equation (2) to implement.

In many cases, the assumption is not accurate in that after overdrive, the actual value of a LC pixel $d_{n-1}$ is always the target value $x_{n-1}$, i.e., it is not always true that $d_{n-1}=x_{n-1}$.

Therefore, the current OD structure defined by Equation (3) may be in many situations an over-simplified structure.

Figure 9:
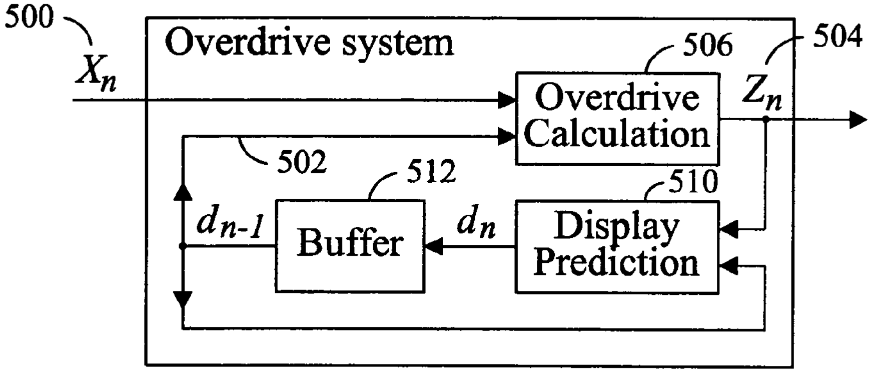
FIG. 9 illustrates another one-frame buffer overdrive.

To reduce the problem that the target value is not always reached by overdrive, a recursive overdrive structure as shown in FIG. 9 may be used. The image data 500 is received which is used together with recursive data 502 to calculate 506 the overdrive 504. A prediction of the display characteristics 510 uses the feedback from a frame buffer 512 and the overdrive 504. There are two calculation modules in the recursive overdrive. Besides the one utilizing Equation (1), another module utilizes Equation (2) to estimate the actual display value $d_n$.

Figure 10:
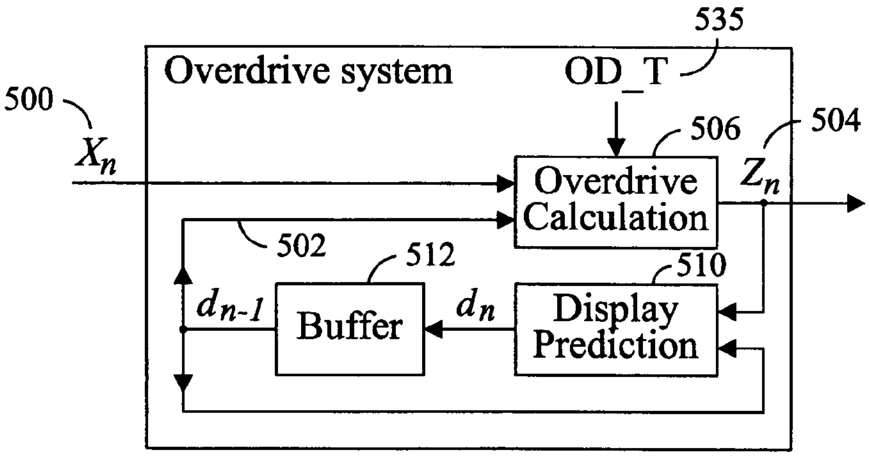
FIG. 10 illustrates an adaptive recursive overdrive.

A further modified Adaptive Recursive Overdrive (AROD) can be implemented to compensate for timing errors. The AROD is modified recursive overdrive (ROD) technique taking into account the time between the LCD driving and flashing, i.e. OD_T 535 as illustrated in FIG. 10.

Figure 11:
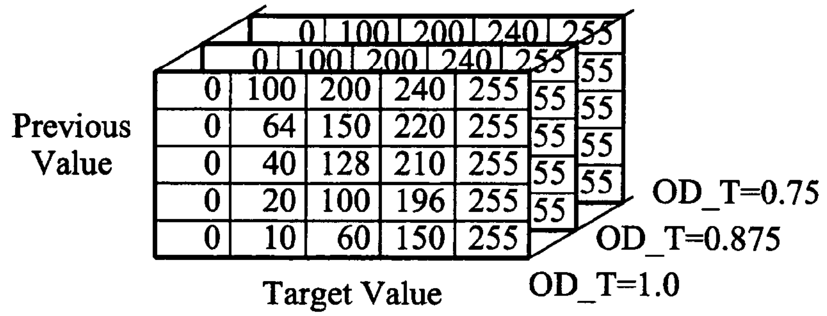
FIG. 11 illustrates an exemplary overdrive value lookup.

In many cases, it is desirable to include an exemplary three-dimensional lookup table (LUT) as shown in FIG. 11. The previous value from the buffer, the target value from video signal, and the OD_T 535, which in many configurations is row dependent, are used to derive the OD value. Since the OD_T 535 is preferably only dependent on the row number, a two-dimensional overdrive table for each row is generated using a one-dimensional interpolation in the OD_T axis. Once an overdrive table which is adapted for the particular OD_T 535 has been determined, the system may overdrive the entire line using the recursive OD algorithm as shown in FIG. 10. The table may also be expanded to include temperature dependence. The computational cost is similar to that of the recursive overdrive.

Values for the overdrive table can be derived from a measured LCD temporal response. The concept of dynamic gamma may be used to characterize the LCD temporal response function. The dynamic gamma describes dynamic input-output relationship of an LC panel during transition times and it is the actual luminance at a fixed time point after a transition starts.

To reduce the influence of disparity of different LC panels, the measured actual display luminance of an LC panel is normalized by its static gamma. More specifically, the measured data are mapped back through the inverse static gamma curve to the digit-count domain (0-255 if LC panel is 8-bit).

Figure 12:
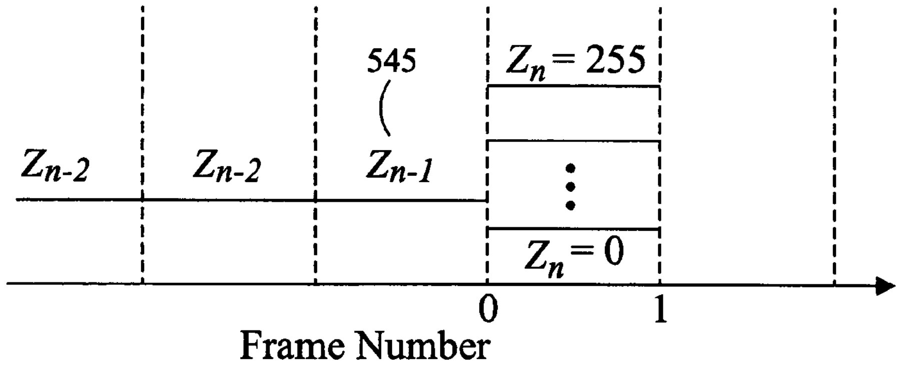
FIG. 12 illustrates an exemplary driving waveform for dynamic gamma.
Figure 13:
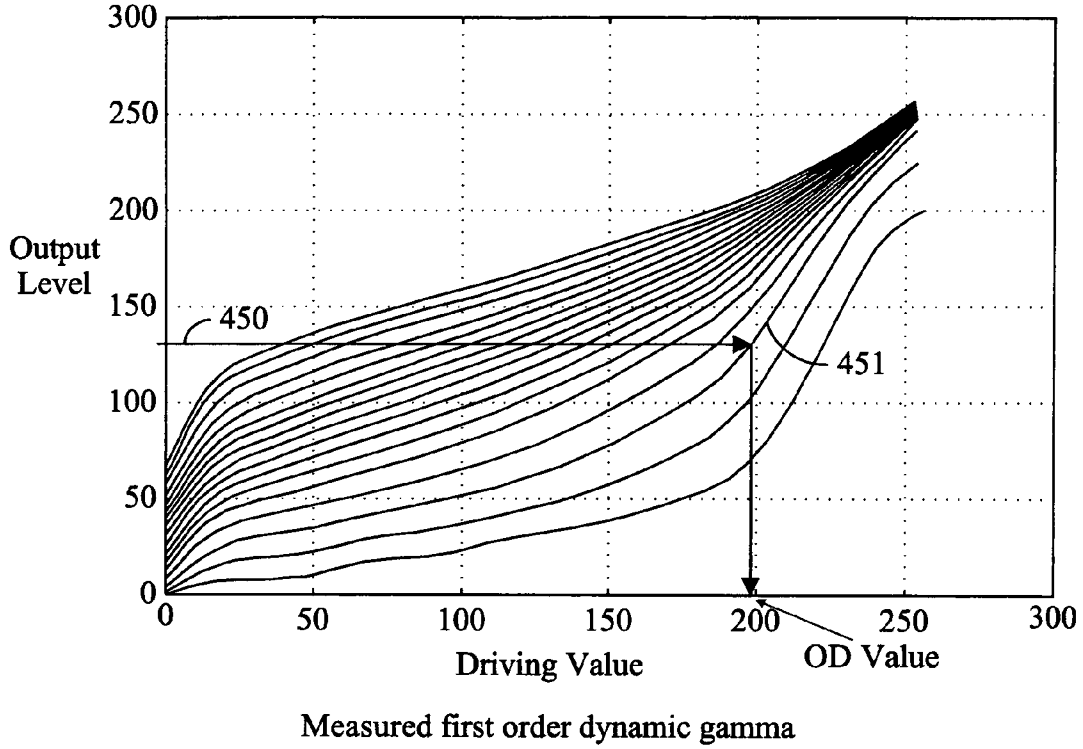
FIG. 13 illustrates the measured first order dynamic gamma.

The measurement system for dynamic gamma may include a driving input is illustrated in FIG. 12. A set of frames Z are illustrates together with a driving waveform. Before frame 0, the driving value $z_{n-1}$ 545 is applied for several cycles to make the pixel into equilibrium state. Then, in the frame 0, different driving value $z_n$, covering the driving range (from 0 to 255 for 8-bit LC panel), is applied, and the corresponding luminance is measured exactly at a time T, T-delta, and T+delta. FIG. 13 shows a measured dynamic gamma for a LCD at one panel temperature (8° C.) at T=1. For each T value, a set of dynamic gamma curves can be derived from the measured temporal response curve.

Overdrive table values can be derived from the dynamic gamma data as illustrated in FIG. 13 with the output levels and driving value curves from a starting point to an ending point. To determine an overdrive value for a transition, such as 32 to 128, the system first determines the dynamic gamma curve corresponding to the previous LCD level, which in this case is the curve 451 indicated by the arrow 450, and then interpolate the driving value to have the output of 128 as shown in FIG. 13.

Figure 14:
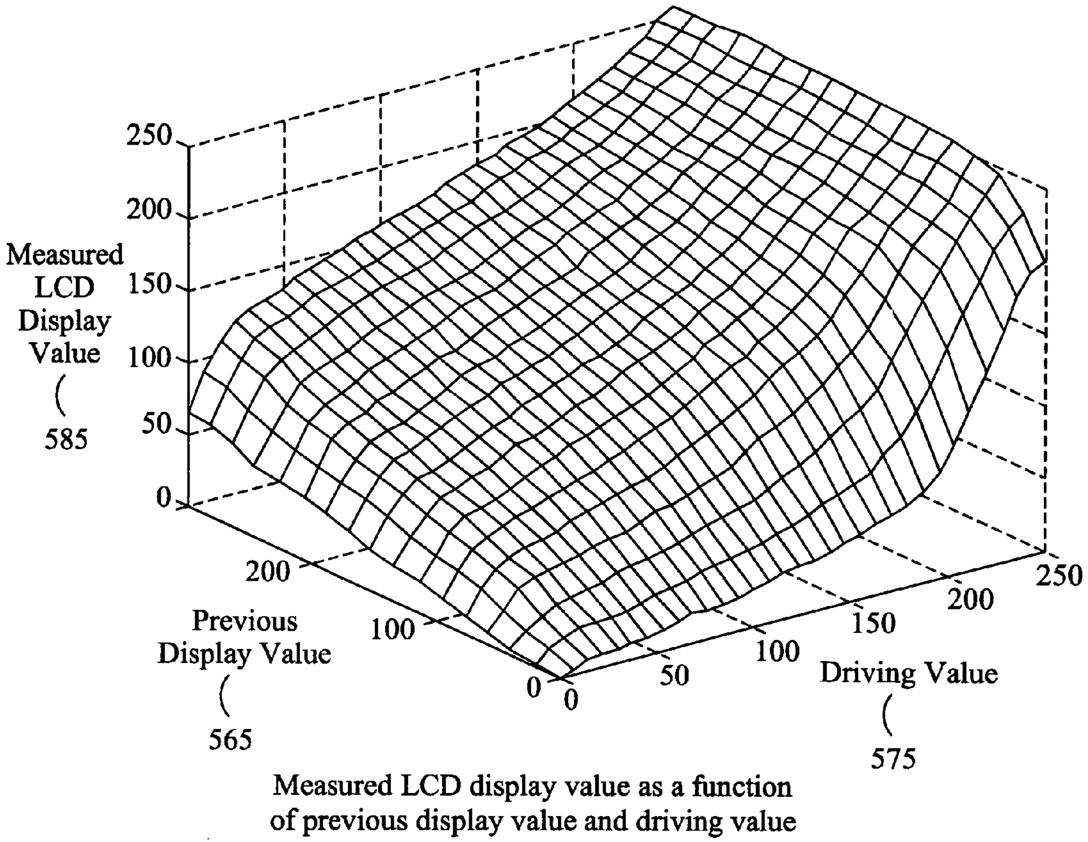
FIG. 14 illustrates the measured LCD display values.

By using dynamic gamma from different T values, a set of overdrive tables can be derived. The model table (the table used to predict the actual LCD output at the end of frame) is the same as recursive overdrive case. FIG. 14 shows a 3D plot of dynamic gamma as a function of previous display value and driving value. A previous display value 565 is matched to the current driving value 575 to determine what the display value of the luminance is likely to be 585. The predicted LCD output is interpolated from measured LCD output levels shown in FIG. 14. Unlike the overdrive table which is flashing dependent, the model table is only dependent on the LCD driving, thus the dynamic gamma for the model table is measured at T=1.

While black point insertion tends to reduce motion blur, it also tends to introduce flickering as an artifact. While the flickering artifact may be reduced by increasing the refresh rate, this is problematic for television based content (e.g., frame or field based content). For television based content, increasing the refresh rate may require motion compensated frame rate conversion which is computationally expensive and prone to additional artifacts.

After intensive study of the human perception of motion blur and flickering, it was determined that the flickering for a black data insertion technique tends to be more visible in a bright, low spatial frequency, non-motion area. In addition, the motion blur for a black data insertion technique tends to be primarily visible in a high spatial frequency, motion area. Based on these characterizations of the human visual system, a processing technique for the video should a motion adaptive technique to reduce motion blur without substantially increasing the flickering. Each frame in a video sequence is divided into multiple regions, and motion detection is performed for each corresponding region in the successive frames (or fields). Each region is classified as either a motion region or a non-motion region. The black data insertion is applied to the motion regions to reduce the motion blur, while black data insertion is not applied to the non-motion regions to reduce flickering. In addition, temporal transition frames may be used to smooth out intensity fluctuations between the black data insertions and the non-black data insertions.

Figure 15:
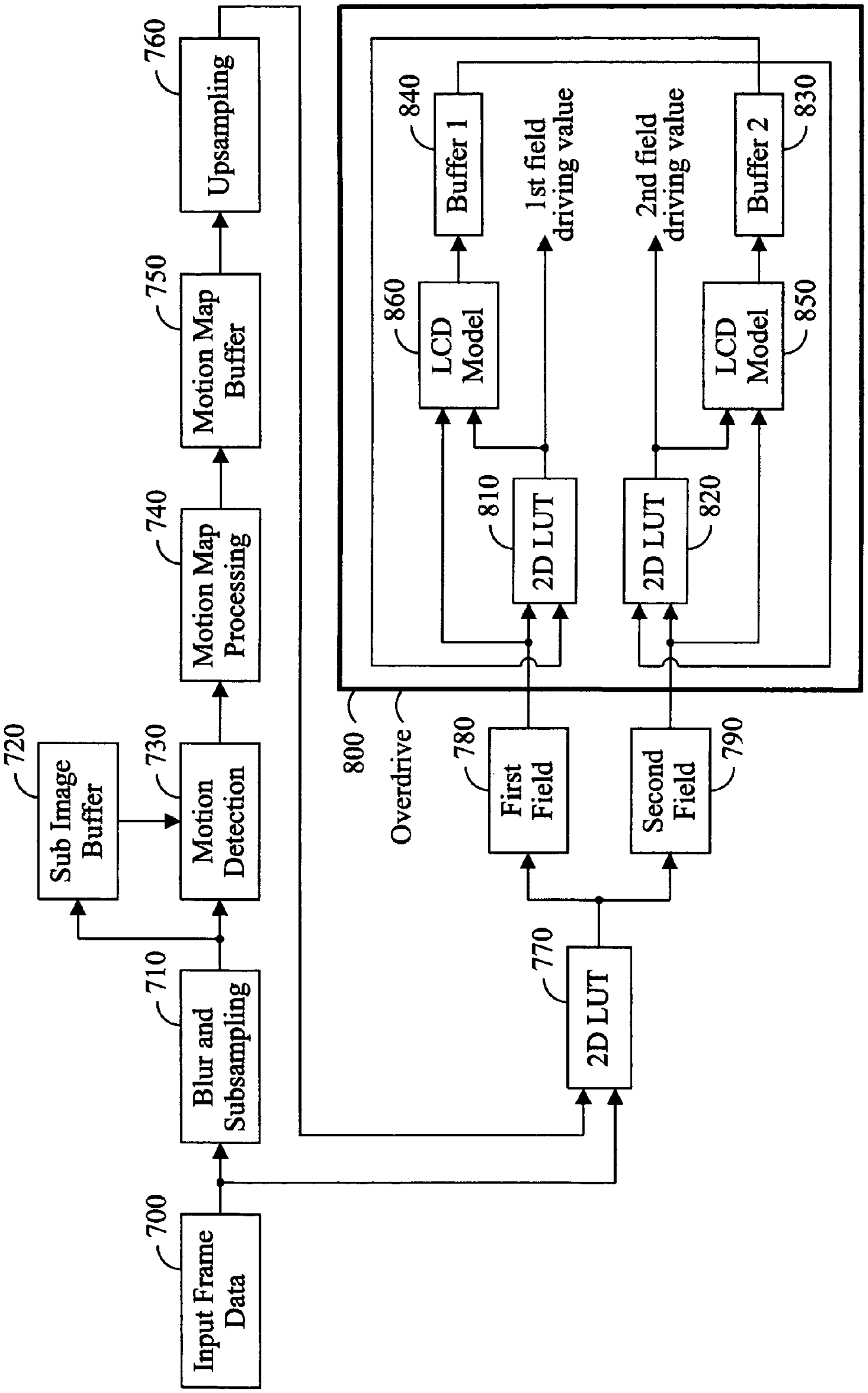
FIG. 15 illustrates motion adaptive black data insertion.
Figure 16A:
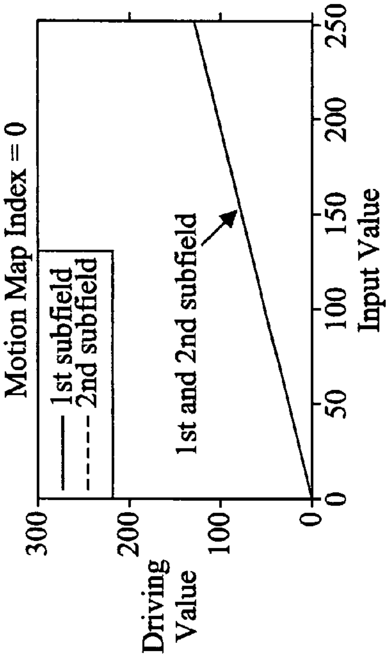
FIGS. 16A-16D illustrate look up tables for field driving values.
Figure 16B:
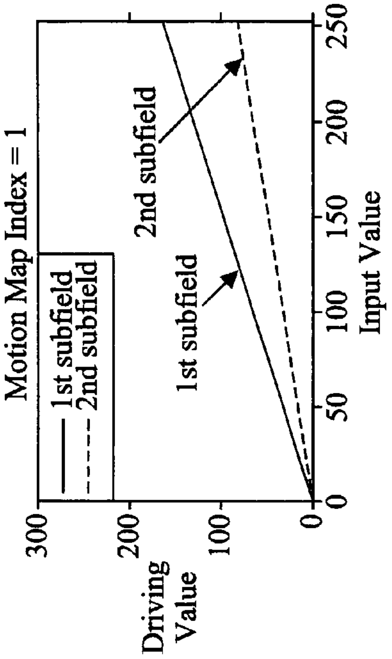
Figure 16C:
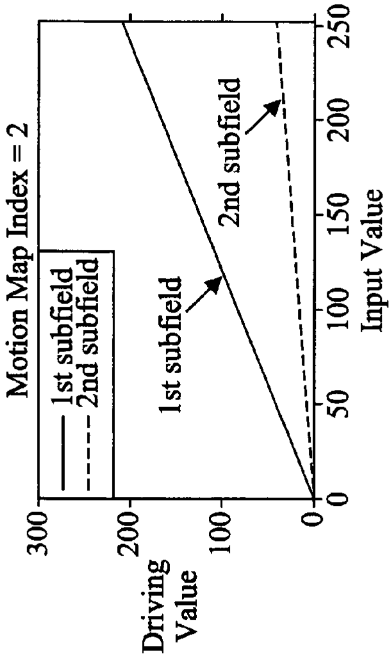
Figure 16D:
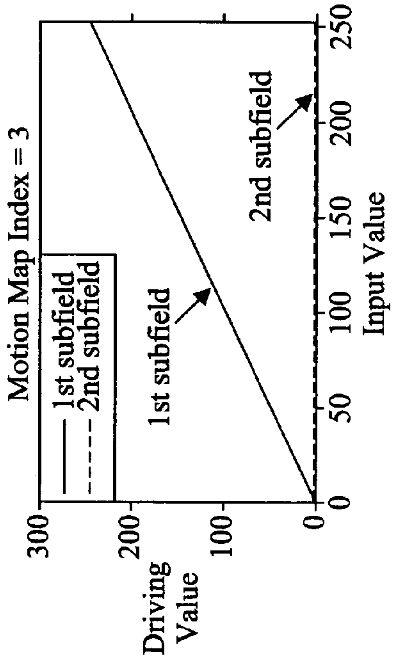

FIG. 15 illustrates a technique for motion adaptive black data insertion. An input frame 700 of data is received. The input frame 700 is preferably blurred and sub-sampled to a lower resolution image 710 to reduce the computational complexity. Each pixel in the lower resolution image 710 corresponds to a region in the input frame 700. Each pixel in the lower resolution image 710 is compared to the previous frame stored in a sub-sampled image buffer 720 to detect motion 730. If the difference between the two pixels is greater than a threshold (such as 5% of the total range), then the pixel is classified as a motion pixel 740. This motion determination is performed on the remaining or selected pixels. Thus, each of the pixels may be characterized as motion, non-motion. The system may include multiple degrees of motion, if desired. A morphological dilation operation may be performed on the motion map 740 to group the non-motion pixels neighboring motion pixels to a motion pixel to form groups of motion pixels with similar motion characteristics. The dilation operation may be approximated with a low pass filter and a subsequent thresholding type operation. The resulting data from the dilation operation may be stored in a motion map buffer 750. Regions with no or limited motion are indicated by a 0 while regions with significant motion are indicated by a 3. There may be transitions between a region with limited motion and a region with significant motion, or vice versa. A change from insignificant motion to significant motion (or vice versa) the system may use a set of transition frames in order to avoid artifacts or other undesirable effects on the resulting image. During the transition, the motion map buffer 750 may indicate such a change in motion with other indicators, such as a region with "limited motion" indicated by a 1 (headed toward 0 or headed toward 2) and a region with "more motion" indicated by a 2 (headed toward 1 or headed toward 3). For example, a transition from no motion to significant motion may be done by a set of indicators of 1 for the frame, 2 for the next frame, and 3 for the subsequent frame (similar for the transition from significant motion to no motion). Other indications may likewise be used, as desired, to indicate additional transition frames and additional degrees of motion. It is to be understood that any type of determination may be used to determine those regions and/or pixels of the image that include sufficient or insufficient motion between one or more frames. The system may detect insufficient motion and sufficient motion, and thus use a set of one or more transition frames to change from one state to the other. In this case, the system does not necessarily need to quantify intermediate states of motion. The system, if desired, may determine intermediate levels of motion that is used together with or without transition frames. The sub-sampled image is stored in the sub-sampled image buffer 720 for subsequent frames. The image in the motion map buffer 750 may be up-sampled 760 to the size of the input image 700.

A look up table 770 is used to determine the field driving values (see FIG. 5) for the fields of the frame (typically two fields in a frame) based upon the up-sampled 760 motion map buffer 750 data. In general, it may be observed that the adaptive black data insertion technique uses a strong black data insertion for those regions of high motion and uses less or non-black data insertion for those regions of low motion. A pair (or more) look up tables may be used to derive the driving values for multiple fields in accordance with the estimated motion. Referring to FIG. 16 several input value versus driving value tables for the look up table 770 are illustrated for different frames and transition frames. In the exemplary technique, if the motion map value has a value of 0 then it indicates non-motion and thus a non-motion look up table (see FIG. 16A) is used. In the exemplary technique, if the motion map value has a value of 1 then it indicates the transition and a different look up table (see FIG. 16B) is used. In the exemplary technique, if the motion map value has a value of 2 then it indicates the transition and a different look up table (see FIG. 16C) is used. In the exemplary technique, if the motion map value has a value of 3 then it indicates significant-motion and thus a significant-motion look up table (see FIG. 16D) is used.

Figure 17:
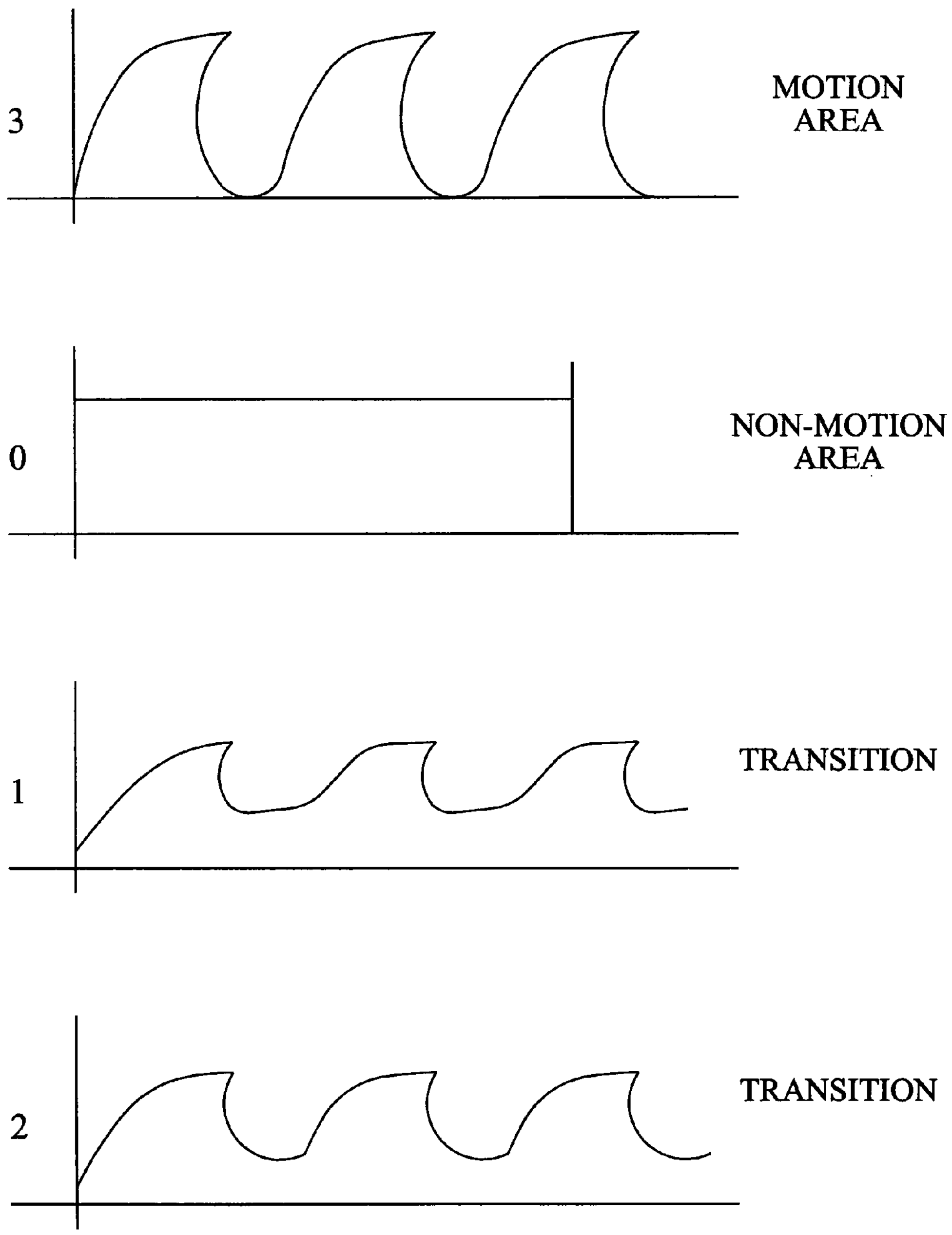
FIG. 17 illustrates the waveforms of FIG. 16

The respective look up tables are applied to the first field 780 and to the second field 790. The output of the first field 780 and second field 790 are provided to an overdrive 800. Any suitable overdrive technique may be used, as desired. The overdrive 800 includes a look up table 810 and 820 for respective first field 780 and second field 790. The output of the look up table 810 for the first field 780 is based upon the output of the previous field from buffer 2 830 (second field of the previous frame). The output of the look up table 820 for the second field 790 is based upon the output of the previous field from buffer 1 840 (first field of the same frame). The state of the previous frame for the first field 780 (input from buffer 2 830) is determined based upon a model of the liquid crystal display 850, the second field 790 of the previous frame, and the output of the look up table 820. The state of the previous frame for the second field 790 (input from buffer 1 840) is determined based upon a model of the liquid crystal display 860, the first field 780 of the previous field, and the output of the look up table 810. Accordingly, the previous field may be used in the overdrive scheme. FIG. 17 illustrates the general resulting waveforms for the driving scheme shown in FIG. 16.

For many liquid crystal displays, overdrive is used to increase the rate of the temporal transitions. It turns out that temperature likewise effects the temporal response of the display. Accordingly, the overdrive tables or values may be modified, based upon temperature in order to compensate for the effects. Overdrive may be omitted, if desired.

Figure 18:
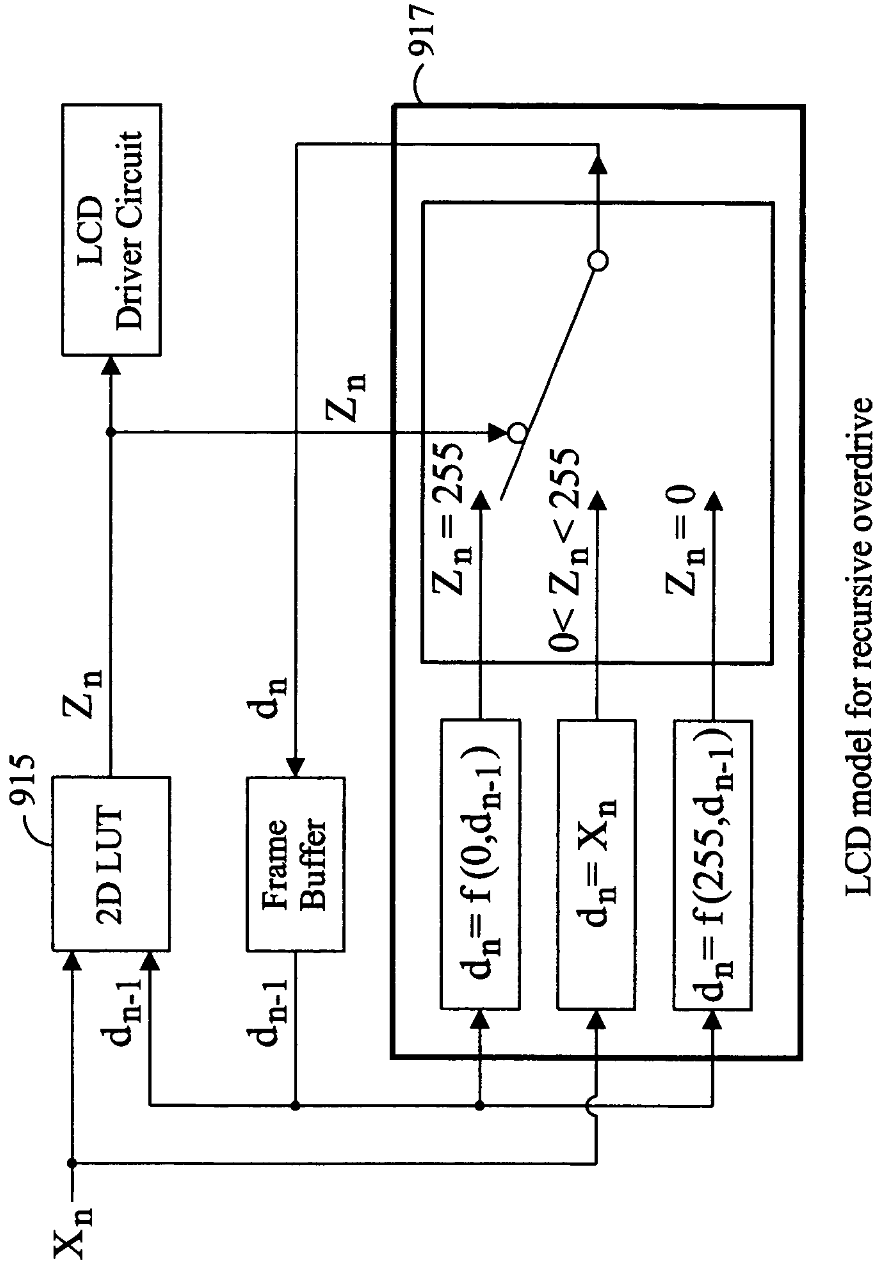
FIG. 18 illustrates liquid crystal display model for recursive overdrive.
Figure 19:
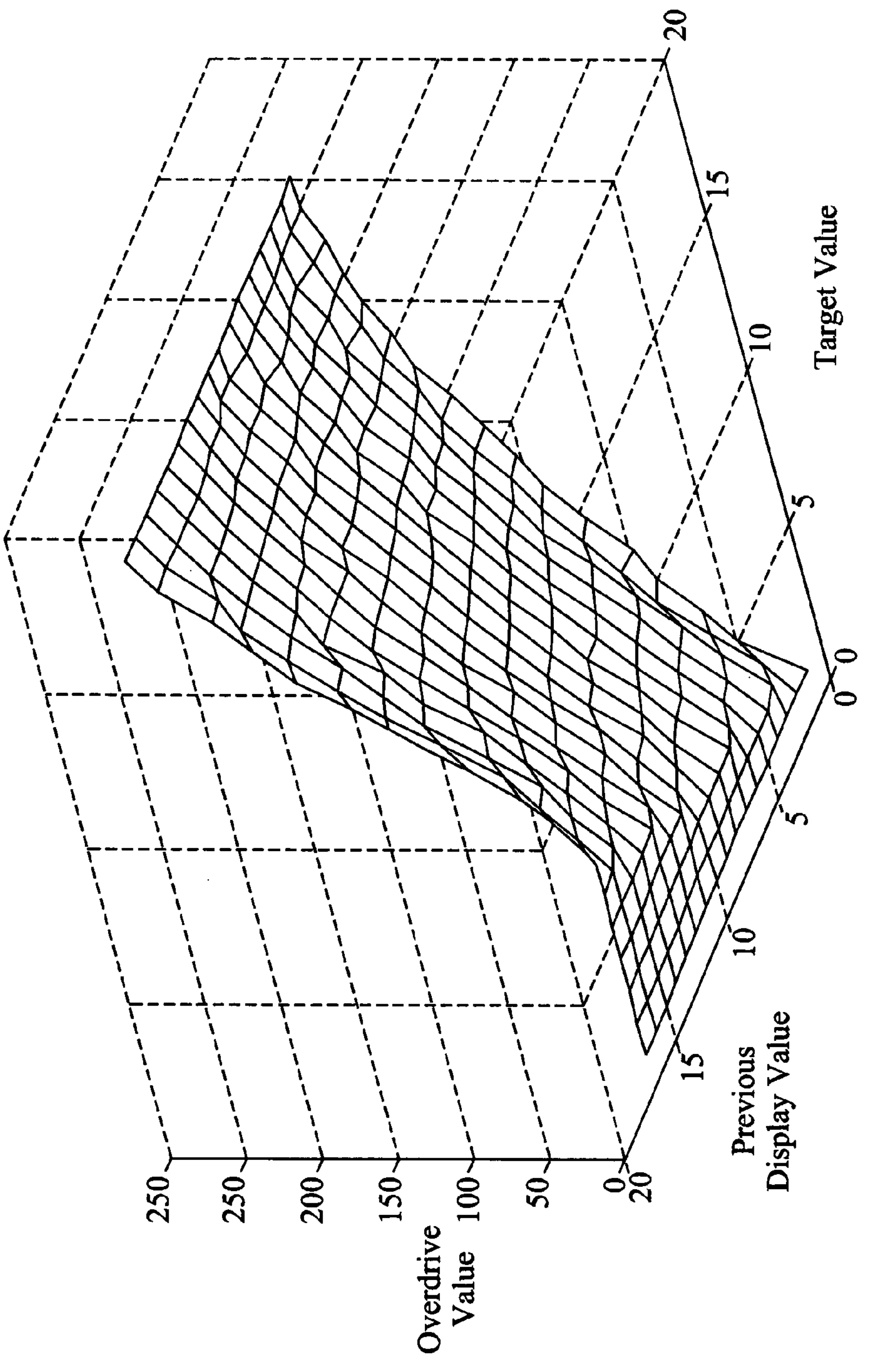
FIG. 19 illustrates lookup overdrive values.

FIG. 18 illustrates a recursive overdrive technique using multiple parts. One part is a 2-dimensional look up table 915 for selecting the overdriving values $z_n$, as illustrated in FIG. 19, another part is a liquid crystal device model 917 for predicting the display output at the end of the field. One characterization for selecting the driving values may be as follows. The current display value $d_n$ is not only determined by the current driving value $z_n$, but also by the previous display value $d_{n-1}$. This may be written as: $d_n=f_d(z_n, d_{n-1})$. To have the display value $d_n$, reach the target value $x_n$, overdriving value $z_n$ should be derived by making $d_n$ to be the target value $x_n$. The overdriving value $z_n$ is determined by two principal values, namely, the previous display value $d_{n-1}$ and the current driving values $x_n$ which can be expressed as: $z_n=f_z(x_n, d_{n-1})$.

Figure 20:
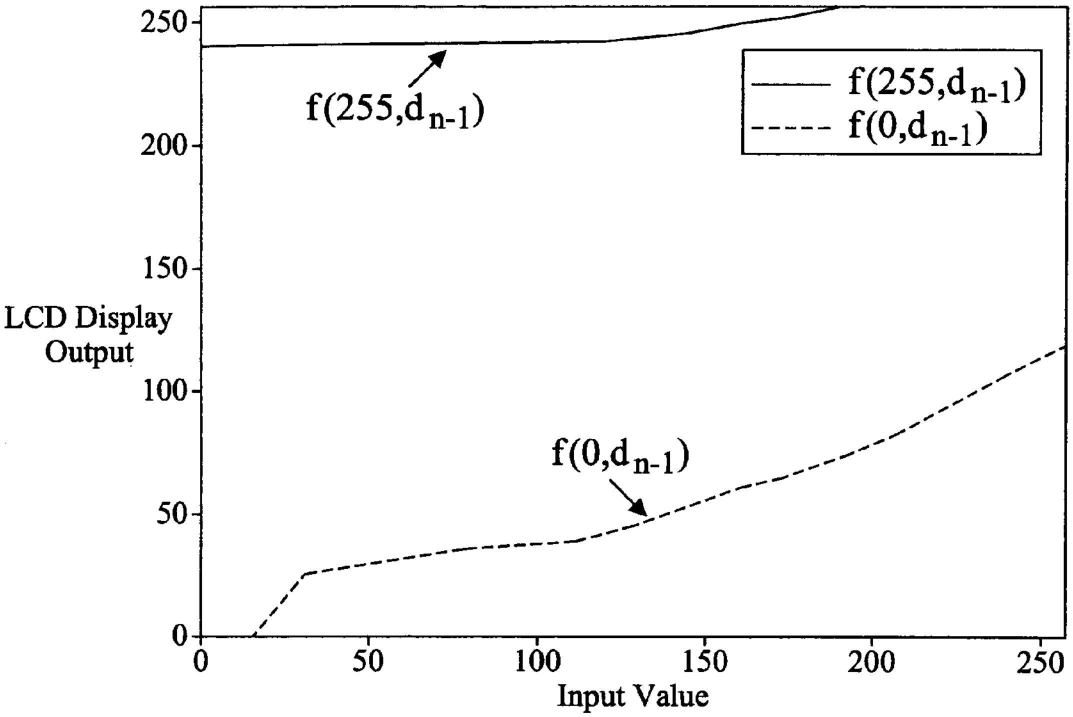
FIG. 20 illustrates liquid crystal display output as a function of previous frame display luminance.

Also referring to FIG. 20, the liquid crystal device model 917 may include a set of three functions for $d_n$. When the output $z_n$ is near maximum (e.g., 255) then the function $d_n=f(0, d_{n-1})$ is used to overdrive toward the maximum. When the output $z_n$ is near minimum (e.g., 0) then the function $d_n=f(255, d_{n-1})$ is used to overdrive toward the minimum. When the output $z_n$ is an intermediate value then the function $d_n=x_n$ is used.

Figure 21:
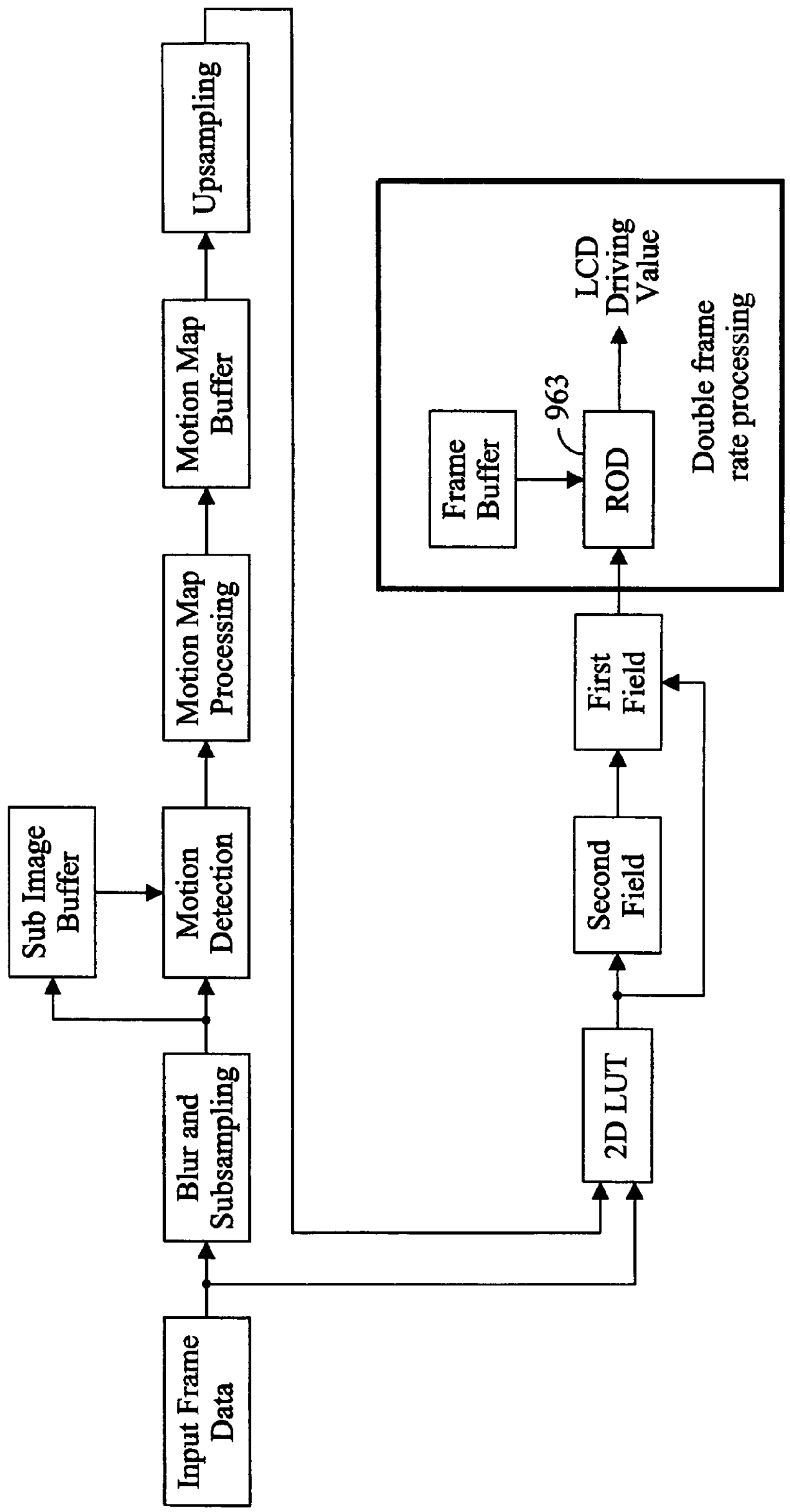
FIG. 21 illustrates an alternative embodiment for motion adaptive black data insertion.

Referring to FIG. 21 another embodiment for motion adaptive black data insertion is illustrated. The recursive overdrive 963, may be for example, that illustrated in FIG. 18. The processing is preferably performed at twice the field rate, namely, the frame rate.

A similar technique may likewise be applied for the overdrive system based upon the spatial frequency of regions of the image, such as low and high spatial frequencies. In addition, a similar technique may be applied for the overdrive system based upon the brightness of regions of the image, such as low brightness and high brightness. These likewise may be applied in combination or based upon one another (e.g., spatial, brightness, and/or motion). The adaptive technique may be accommodated by applying the spatial modifications to the LCD layer of the display. Also, the transition frames may be accommodated by applying the spatial modifications to the backlight, such as a LED array. Moreover, the technique may be accommodated by a combination of the LCD layer and the backlight layer.

All the references cited herein are incorporated by reference.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A method for displaying an image on a liquid crystal display including a light valve comprising:

(a) receiving an image signal;

(b) modifying said light valve with one or more overdrive values, during a first period of a frame, for a first region of said image, said overdrive values selected based upon motion within said first region, where said overdrive values are calculated as a function of a target luminance for said first region during said frame and a luminance for said first region during another frame that precedes said first frame;

(c) selectively modifying said light valve with a second value, during a second period of said frame, based upon said motion of said first region, where said second value is a selective one of said overdrive value and a black level luminance for said frame, different from said overdrive value; wherein (d) said light valve is modified for different portions of said image to respectively different said overdrive values for a single frame, said different overdrive values selected using respectively different look-up tables accessible to said display.

2. The method of claim 1 wherein said black level luminance value is substantially zero.

3. The method of claim 1 wherein said display includes a plurality of backlights.

4. A method for displaying an image on a display including a light valve comprising:

(a) receiving an image signal;

(b) based upon motion of a first pixel of said light valve, selectively either driving a first pixel of said light valve to a black level luminance value over a first sub-period of a frame of said image, or not driving said first pixel of said light valve to a black luminance value over said first sub-period of said frame; and (c) modifying said first pixel of said light valve with a non-zero overdrive value over a second sub-period of said frame, where said non-zero overdrive value has a magnitude selected from among a range of values, selection based on whether said pixel is driven to said black level luminance during said first sub-period.

5. The method of claim 4 wherein said overdrive value is based upon addressing timing of an illumination of a respective light emitting element of said light valve.

6. The method of claim 4 wherein said overdrive value is relatively less than it otherwise would have been if said pixel is determined to have relatively greater said motion.

7. A method for displaying an image on a display including a light valve comprising:

(a) receiving an image signal and spatially segmenting said signal into a plurality of regions, each region comprising a plurality of pixels and having a respective motion value together comprising a motion map of said image;

(b) using said motion map to selectively modify the output to be provided by a first pixel of said display to a first luminance value during a first period of a frame, selection based upon the motion value for the respective said region associated with said first pixel, and modifying the output of said first pixel of said display to a second luminance value during another period of said frame, said second luminance value having a magnitude based upon selection of said first luminance value; and (c) selectively modifying the output to be provided by a second pixel of said display to a third luminance value during said first period of said frame, selection based upon the motion value for the respective said region associated with said second pixel, and modifying the output of said second pixel of said display to a fourth luminance value during said another period of said frame, said fourth luminance value having a magnitude based upon selection of said third luminance value, where said third luminance value is different than said first luminance value.

8. The method of claim 7 wherein said first period and said another period are two fields comprising said frame.

9. The method of claim 7 wherein said first luminance value is substantially zero, and said fourth luminance value is substantially equal to said third luminance value.

* * * * *